United States Patent [19]

Reinecke et al.

[11] Patent Number: 5,159,992
[45] Date of Patent: Nov. 3, 1992

[54] INFINITELY VARIABLE HYDROSTATIC TRANSMISSION DRIVE

[75] Inventors: Udo Reinecke, Dortmund; Gustav Leidinger, Friedberg, both of Fed. Rep. of Germany

[73] Assignee: O&K Orenstein & Koppel Aktiengesellschaft, Dortmund, Fed. Rep. of Germany

[21] Appl. No.: 759,112

[22] Filed: Sep. 6, 1991

Related U.S. Application Data

[63] Continuation of Ser. No. 475,045, Feb. 2, 1990, abandoned.

[30] Foreign Application Priority Data

Mar. 9, 1989 [DE] Fed. Rep. of Germany ....... 3907633

[51] Int. Cl.$^5$ ............................................ B60K 17/356
[52] U.S. Cl. ........................................ 180/307; 60/484
[58] Field of Search ...................... 180/305, 307, 308; 60/484, 485

[56] References Cited

U.S. PATENT DOCUMENTS

| 3,320,829 | 5/1967 | Cull ................................ 180/307 X |
| 3,421,389 | 1/1969 | Fauchere .......................... 60/484 X |
| 3,513,654 | 5/1970 | Engel .................................. 60/485 |
| 3,637,036 | 1/1972 | Swisher, Jr. et al. ............. 180/307 |
| 4,069,884 | 1/1978 | Morrow, Sr. et al. ............ 180/6.48 |

FOREIGN PATENT DOCUMENTS

| 0026115 | 4/1981 | European Pat. Off. . |
| 0282010 | 9/1988 | European Pat. Off. . |
| 1065734 | 9/1957 | Fed. Rep. of Germany . |
| 1135305 | 8/1962 | Fed. Rep. of Germany . |
| 2735423 | 2/1978 | Fed. Rep. of Germany . |
| 3107991 | 9/1982 | Fed. Rep. of Germany ...... 180/305 |
| 3409561 | 9/1985 | Fed. Rep. of Germany ...... 180/305 |
| 3409566 | 9/1985 | Fed. Rep. of Germany . |
| 8001668 | 8/1980 | PCT Int'l Appl. . |
| 0614977 | 6/1978 | U.S.S.R. .............................. 180/305 |
| 0779105 | 11/1980 | U.S.S.R. .............................. 180/305 |
| 1131750 | 10/1968 | United Kingdom . |
| 1529247 | 10/1973 | United Kingdom . |
| 1386569 | 3/1975 | United Kingdom ................ 180/305 |
| 1601239 | 10/1981 | United Kingdom . |
| 2083893 | 3/1982 | United Kingdom . |
| 2089007 | 6/1982 | United Kingdom . |
| 2119405 | 11/1983 | United Kingdom . |

Primary Examiner—David M. Mitchell
Assistant Examiner—Brian L. Johnson
Attorney, Agent, or Firm—Martin A. Farber

[57] ABSTRACT

An infinitely variable hydrostatic transmission drive for self-propelled machines having a plurality of transmission motors which are fed from a common displaceable transmission-drive pump, at least one variable displacement motor having a swashplate which can be swung back into a zero position and at least one fixed displacement motor are provided in hydraulic parallel circuit. The motors operate in at least one case via a common back gearing on a common output, a shift coupling being provided between the variable displacement motor and an output.

10 Claims, 2 Drawing Sheets

1

INFINITELY VARIABLE HYDROSTATIC TRANSMISSION DRIVE

RELATED APPLICATION

This application is a continuation of our co-pending application Ser. No. 07/475,045 filed Feb. 2, 1990 and now abandoned.

FIELD AND BACKGROUND OF THE INVENTION

The invention relates to an infinitely variable hydrostatic transmission drive for self-propelled vehicles having a plurality of hydraulic transmission motors which are fed by a common adjustable transmission drive pump and to a method of operating such a drive.

SUMMARY OF THE INVENTION

It is an object of the invention to provide a purely hydrostatic transmission drive which is infinitely variable over the entire speed range and has two or more motors in order to obtain speeds of up to about 50 kilometers per hours. In this connection, the drive is to be compact and economical and, in particular, suitable for the use on earth-moving vehicles with drive powers of up to 250 hp.

According to the invention, at least one variable displacement motor having a swashplate which can be swung or pivoted into a zero position and at least one fixed displacement motor are provided in a hydraulic parallel circuit. The motors operate in at least one case via a common back gearing on a common output, a shift coupling being provided between the variable displacement motor and an output.

Also according to the invention, there is provided a method of operating a transmission drive according to the above, comprising the following steps:

for the driving of the self-propelled vehicle, the transmission motors, all of which are set to full-absorption volume, are fed with an increasing swashplate pivot angle of the transmission-drive pump;

with the full swashplate pivot angle of the transmission-drive pump, the first variable displacement motor is then continuously swung back up into the limit position of its highest permitted speed of rotation based on technical or economic factors;

after reaching the limit position, the swashplate angle for displacement of the variable displacement motor is suddenly brought to self-locking and the swashplate pivot of the transmission-drive pump is reduced by the amount which corresponds to the last absorption volume of the first variable displacement motor, and the variable displacement motor is disconnected from the output by the shift coupling;

the swashplate angle of the transmission-drive pump is then again brought increasingly to the maximum swashplate angle, the highest drive speed being then reached; and for the reduction again of the drive speed of rotation of the output, the above steps and procedures are carried out in the reverse order.

Still further according to the invention, there is provided a hydrostatic drive transmission for self-propelled machines having a plurality of transmission motors which are fed by a common displaceable transmission-drive pump, characterized by the fact that a first variable displacement motor having a swashplate which can be swung back into a zero position and at least one second variable displacement motor having a swashplate which can be swung are provided in a hydraulic parallel circuit. The motors operate in at least one case via a back gearing on a common output, a shift coupling being provided between the first variable displacement motor and the output.

Also according to the invention, there is provided a method of operating a drive transmission according to the above, comprising the steps of:

for the driving of the self-propelled machine, the transmission motors, which are set to full-absorption volume, are fed with an increasing swashplate pivot angle of the transmission-drive pump;

with the maximum swashplate angle of the transmission-drive pump, the first variable displacement motor is then operated with its swashplate continuously swung back into the limit position of its highest permissible speed of rotation based on technical or economic factors;

after reaching the limit position, the swashplate angle for displacement of the first variable displacement motor is suddenly brought to self-locking, and the swashplate angle of the transmission-drive pump is reduced by the amount which corresponds to the last absorption volume of the first variable displacement motor and is disconnected from the output by the shift coupling;

the swashplate pivot angle of the transmission-drive pump is again increasingly brought to the maximum pivot angle and, after same has been reached, the second variable displacement motor is operated by pivoting the swashplate continuously up to the limit position of its highest permitted speed of rotation determined by technical or economic factors, the highest drive speed of rotation being then reached; and for the decreasing again of the drive speed of rotation of the output, the above steps and procedures are carried out in the reverse order.

The advantage of the invention is that the shift gears previously used in this speed range, including their open and closed loop control systems, are eliminated. Hand in hand with this, extensive relief of the driver in the driving processes is obtained and new possible forms of designs are obtained for the vehicle on basis of the freer arrangement of the parts, particularly of the drive arrangements, which can be provided in this sequence on one or more shafts.

A further feature of the invention is that the transmission ratios of the back gearing between the variable displacement motor and the output and between the fixed displacement motor and the output are different.

Still further according to the invention, the transmission ratio of the switchable back gearing between the variable displacement motor and the output is greater than the transmission ratio of the back gearing between the fixed displacement motor and the output.

Moreover, a feature of the invention is that the output is provided by an axle drive shaft.

Another feature of the invention is that the output, in the case of independent axle drive shafts, is represented by the circumferential speed of the driven wheels.

BRIEF DESCRIPTION OF THE DRAWINGS

With the above and other objects and advantages in view, the present invention will become more clearly understood in connection with the detailed description of a preferred embodiment when considered with the accompanying drawing in which.

DETAILED DESCRIPTION OF THE PREFERRED EMBODIMENT

Figure 1:
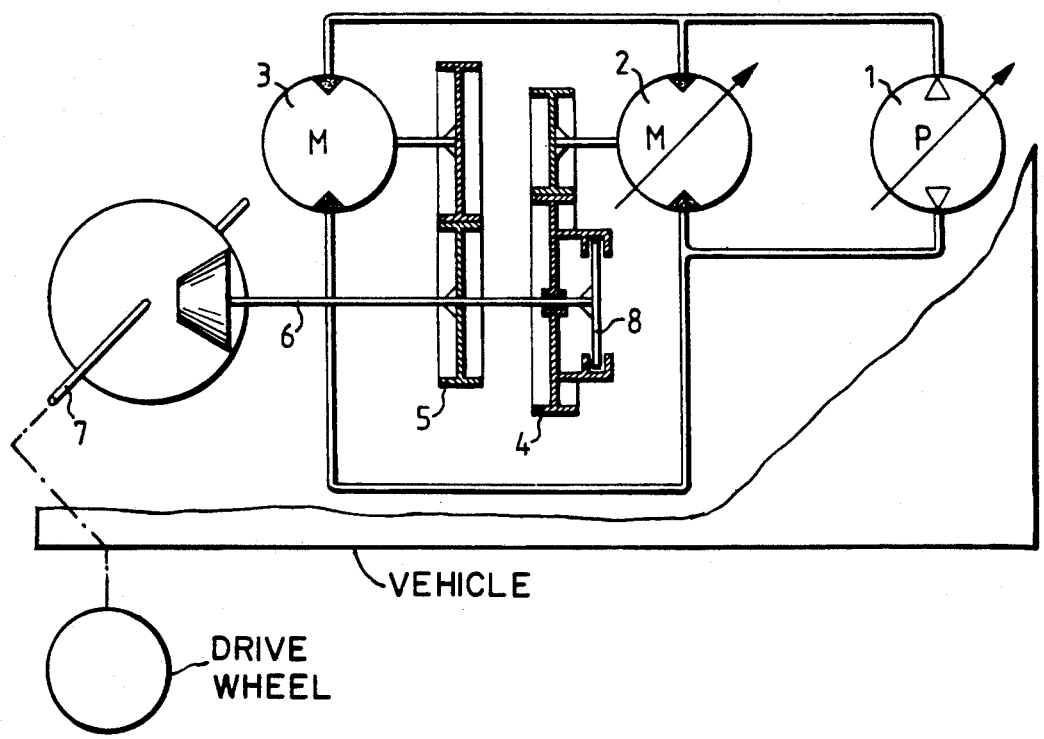
FIG. 1 shows an infinitely variable hydrostatic drive transmission, partly in section.

The infinitely variable hydrostatic transmission drive for self-propelled vehicles having a plurality of transmission motors is shown in the drawing. These transmission motors are fed by a common displaceable transmission-drive-pump 1. A variable displacement motor 2 which includes a swashplate (not shown) that can be swung back into a zero position, and a fixed displacement motor 3 are provided in a hydraulic parallel circuit.

In this connection, the variable displacement motor 2 operates via a switchable back gearing 4 and the fixed displacement motor 3 operates via a back gearing 5, both on a common output 6. The latter can be represented by an axle drive shaft 6 which is in engagement with an axle drive 7.

As shown in the drawing, a shift coupling 8 is provided between the variable displacement motor 2 and the output 6. In this connection it is basically immaterial for the invention whether the coupling 8 is installed between the back gearing 4 and the output 6 or, between the variable displacement motor 2 and the back gearing 4.

Referred to the output 6, the transmission ratios of the switchable back gearing 4 and the back gearing 5 are selected to be different. While the gear ratio is approximately the same in the case of the back gearing 5 of the fixed displacement motor 3, the gear ratio is selected to be larger, as is essential to the invention, in the case of the switchable back gearing 4 which is connected to the variable displacement motor 2.

The development of a transmission drive in which the variable displacement motor 2 and the fixed displacement motor 3 can operate on different drive shafts with the interposition of back gearings is not shown in the drawing, but it can easily be visualized. The total transmission ratio to be maintained between each drive motor and the output must then refer to the common output value which is then still present. Here, for instance, the circumferential speed of the driven wheels of a vehicle can be taken as basis.

Figure 2:
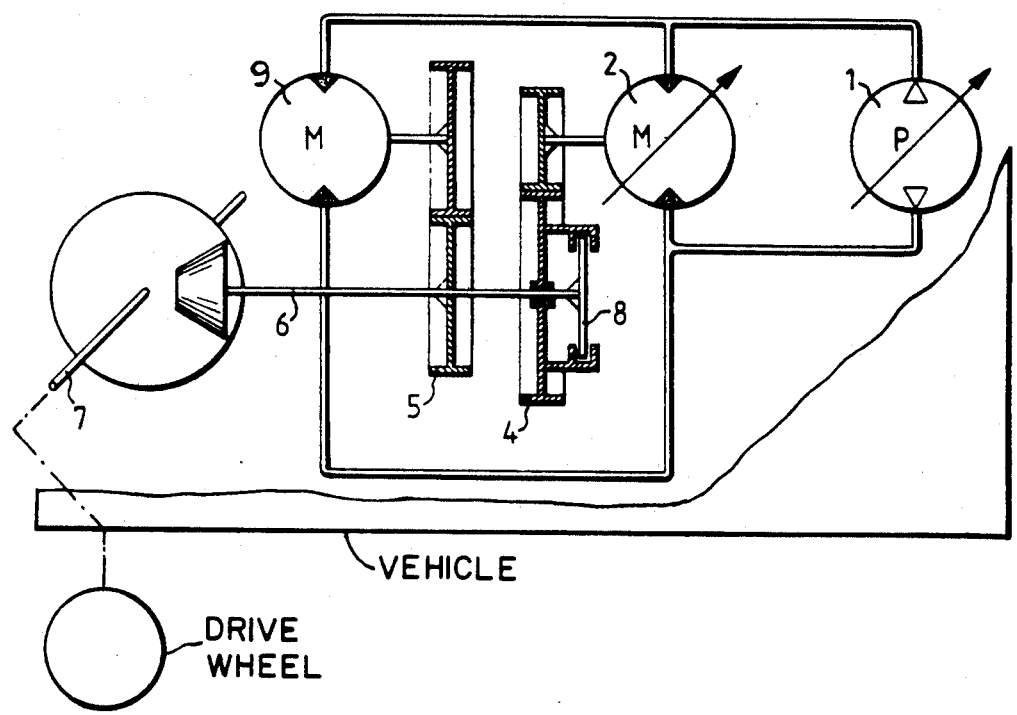
FIG. 2 shows a modification of the system of FIG. 1 by inclusion of two variable displacement motors.

The development of a hydrostatic transmission drive in such a manner that the fixed displacement motor 3, i.e. a motor with constant absorption volume, is replaced by a drive motor with adjustable absorption volume corresponding to that of the variable displacement motor 2 is shown in FIG. 2 in the drawing. The principles of operation of the invention apply also to the system of motors and transmission disclosed in FIG. 2 wherein a second variable displacement motor 9 is substituted in the place of the fixed displacement motor 3 (FIG. 1) for control of the vehicle speed.

The construction of a transmission drive in which the fixed displacement motor 3 operates without interposition of a back gearing and therefore directly on the output 6 is also conceivable, without limiting the invention.

The transmission drive described above operates in the manner that, with a high requirement of tractive force, i.e. at low speeds, all transmission motors, set to full-absorption volume, act on the drive shaft. After the transmission-drive pump has reached its full angle of deflection corresponding to the maximum delivery volume, the variable displacement motor, which has the possibility of the swashplate setting angle $\alpha = 0$ to swing back, namely to an angle of swing of which either the highest permissible speed of rotation for this variable displacement motor is reached or else, due to the increasingly impaired efficiency with decreasing angle of displacement, further included operation is refrained from. After reaching this limit position, the variable displacement motor 2 is brought with rapid transition, i.e. suddenly, to the swashplate angle $\alpha = 0$ or at least up into the region of self-locking and is separated from the output 6 by the shift coupling 8. At the same time, the swashplate of transmission drive pump 1, in this connection, must be temporarily swung back since no further partial stream of oil flows to the variable displacement motor.

In order further to increase the speed of travel by the fixed displacement motor 3 which is still in action, the transmission-drive pump now begins to swing out again. The final speed is reached when the fixed displacement motor 3 or, in an embodiment with several fixed displacement motors, or else when using one or more variable displacement motors, reach the permissible speed of rotation determined on basis of technical and economic factors.

Upon a reduction of the speed from higher speed ranges, the steps and processes individually described above are passed through in reverse order. With a given requirement of tractive force in the lower speed range, the shift coupling 8 is then again closed and the variable displacement motor 2 is again placed in action.

We claim:

1. A system for propelling vehicles comprising
   an infinitely variable hydrostatic transmission drive having a plurality of transmission motors and a common adjustable transmission drive pump feeding the motors; and
   wherein the motors include at least one variable displacement motor which is variable from full absorption volume to minimum absorption volume, and at least one fixed displacement motor, said motors being connected in a parallel hydraulic circuit;
   said system further comprises a common back gearing having a common output, and a shift coupling;
   wherein at least one of said motors operates via said common back gearing with said common output, said shift coupling being operable to connect the variable displacement motor with the common output, said shift coupling being operative at different vehicle speeds to effect connection and disconnection of the variable displacement motor to accomplish a desired vehicular speed; and
   said variable displacement motor is operative to undergo a transition from the full absorption volume to the minimum absorption volume upon a disconnection of said first variable displacement motor from said common output by said shift coupling.

2. A system according to claim 1, wherein
   the back gearing provides a plurality of different transmission ratios between the variable displacement motor and the output, a transmission ratio of the variable displacement motor differing from a transmission ratio of the fixed displacement motor.

3. A system according to claim 2, wherein the back gearing comprises a first and a second portion of the gearing; and the first portion of the back gearing is switchable, and the transmission ratio of the first portion of the back gearing between the variable displacement motor and the output is greater than the transmission ratio of the second portion of back gearing between the fixed displacement motor and the output.

4. A system according to claim 1, wherein
the output comprises an axle drive shaft.

5. A system according to claim 1, wherein
the output comprises an independent axle drive shaft for driving the wheels of a vehicle, a speed of the output being a circumferential speed of the driven wheels.

6. A hydrostatic drive transmission for self-propelled vehicles comprising
a plurality of hydraulic transmission motors;
a common displaceable transmission-drive pump which feeds said motors;
a back gearing having a common output and including a shift coupling; and
wherein said motors include a first variable displacement motor which is variable from full absorption volume, and at least one second variable displacement motor which is variable from full absorption volume to minimum absorption volume, said first and said second motors being connected in a parallel hydraulic circuit, at least one of said motors operating via said back gearing to drive said common output;
said shift coupling is connected between said first variable displacement motor and said output; and
said first variable displacement motor is operative to undergo a transition from the full absorption volume to the minimum absorption volume upon a disconnection of said first variable displacement motor from said common output by said shift coupling.

7. A method of operating a transmission drive for a self-propelled vehicle having a plurality of hydraulic transmission motors fed by a common adjustable transmission drive pump, the motors including a variable displacement motor and a fixed displacement motor, the motors operating through a common gearing having a common output, the gearing including a shift coupling with a shaft of the common output, the method comprising the steps of:
for the driving of the vehicle, feeding the transmission motors, said motors being set to full-absorption volume, and increasing a displacement volume of the transmission-drive pump;
upon attaining maximum displacement volume of the transmission-drive pump, operating the variable displacement motor by continuously increasing a displacement volume thereof to a maximum value for obtaining efficient speed of rotation;
after reaching the maximum displacement volume of the variable displacement motor, altering the displacement volume of the variable displacement motor to a self-locking position, reducing the displacement volume of the transmission-drive pump by an amount which corresponds to a last absorption volume of the variable displacement motor, and disconnecting the variable displacement motor from the output by the shift coupling; and
increasing the displacement volume of the transmission-drive pump again increasingly to the maximum displacement volume, a highest drive speed of the vehicle then being reached.

8. A method according to claim 7 further comprising a step of
reducing the drive speed of rotation of said output shaft by implementing the steps of claim 7 in reverse order.

9. A method of operating a transmission drive for a self-propelled vehicle having a plurality of hydraulic transmission motors bed by a common adjustable transmission drive pump, the motors including a first and a second variable displacement motor, the motors operating through a common gearing having a common output, the gearing including a shift coupling with a shaft of the common output, the method comprising the steps of:
for the driving of the vehicle, feeding the transmission motors, which are set to full-absorption volume, and increasing a displacement volume of the transmission-drive pump;
upon attaining maximum displacement volume of the transmission-drive pump, operating the first variable displacement motor by continuously increasing a displacement volume thereof to a maximum value for obtaining efficient speed of rotation;
after reaching the maximum displacement volume of the first variable displacement motor, altering the displacement volume of the first variable displacement motor to a self-locking position, reducing the displacement volume of the transmission-drive pump an amount which corresponds to a last absorption volume of the first variable displacement motor, and disconnecting the first motor from the output by operating the shift coupling; and
increasing the displacement volume of the transmission-drive pump again, increasingly to the maximum displacement volume and, thereupon, operating the second variable displacement motor by continuously increasing the displacement volume thereof to a maximum value for obtaining efficient speed of rotation, a highest drive speed of rotation of the output then being achieved.

10. A method according to claim 9, further comprising a step of
reducing the drive speed of rotation of the output by implementing the steps of claim 9 in reverse order.

* * * * *